(12) United States Patent
Mutnury et al.

(10) Patent No.: US 9,742,464 B2
(45) Date of Patent: Aug. 22, 2017

(54) APPARATUS AND METHOD FOR SEMI-CIRCULAR ROUTING FOR TRANSMISSION LINE SIGNALS

(71) Applicant: Dell Products, LP, Round Rock, TX (US)

(72) Inventors: Bhyrav M. Mutnury, Round Rock, TX (US); Mallikarjun Vasa, Secunderabad (IN)

(73) Assignee: DELL PRODUCTS, LP, Round Rock, TX (US)

( * ) Notice: Subject to any disclaimer, the term of this patent is extended or adjusted under 35 U.S.C. 154(b) by 6 days.

(21) Appl. No.: 14/802,434

(22) Filed: Jul. 17, 2015

(65) Prior Publication Data
US 2017/0019145 A1    Jan. 19, 2017

(51) Int. Cl.
*H01P 5/12* (2006.01)
*H04B 3/32* (2006.01)
*H01P 3/08* (2006.01)

(52) U.S. Cl.
CPC ............ *H04B 3/32* (2013.01); *H01P 3/08* (2013.01); *H01P 3/081* (2013.01)

(58) Field of Classification Search
CPC . H04B 3/32; H01P 3/081; H01P 3/088; H01P 3/02; H05K 1/0228; H05K 1/0245; H05K 2201/097
USPC ........................................................... 333/1
See application file for complete search history.

(56) References Cited

U.S. PATENT DOCUMENTS

| 6,774,741 B2* | 8/2004 | McCurdy | H01P 3/02 333/1 |
| 2010/0327989 A1 | 12/2010 | Abbott et al. | |
| 2015/0333387 A1* | 11/2015 | Xiao | H01P 3/08 333/1 |

OTHER PUBLICATIONS

Lee, S. K., K. Lee, H. J. Park, and J. Y. Sim, "FEXT-eliminated stub-alternated microstrip line for multi-gigabit/second parallel link," Electron. Lett., vol. 44, No. 4, 272-273, Feb. 2008.
Chhay, S.K. ; Kunze, R.K. ; Yunhui Chu, "Crosstalk mitigation in dense microstrip wiring using stubby lines," Electrical Performance of Electronic Packaging and Systems (EPEPS), 2013 IEEE 22nd Conference, Oct. 27-30, 2013, pp. 231-234.

* cited by examiner

*Primary Examiner* — Robert Pascal
*Assistant Examiner* — Kimberly Glenn
(74) *Attorney, Agent, or Firm* — Larson Newman, LLP

(57) ABSTRACT

An information handling system includes a stripline transmission line, the stripline transmission line including a plurality of conductors, each one of the conductors having a mitigation conductor section and a non-mitigation conductor section. The mitigation conductor section includes a first linear section having a first side surface and a second side surface, and a plurality of substantially semi-circular stubs extending from the first side surface of the first liner section. The mitigation conductor section is configured to mitigate near end cross talk between the mitigation conductor section and adjacent conductors.

20 Claims, 17 Drawing Sheets

APPARATUS AND METHOD FOR SEMI-CIRCULAR ROUTING FOR TRANSMISSION LINE SIGNALS

FIELD OF THE DISCLOSURE

This disclosure generally relates to information handling systems, and more particularly relates to semi-circular routing for transmission line signals.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. An information handling system can include semi-circular routing for transmission line signals in an information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-4 illustrate semi-circular stubs transmission lines for the transmission and reception of a plurality of diverse microwave frequency signals, high-speed digital signals, and high-speed analogue signals, and to mitigate near end cross talk between conductors of the semi-circular stubs transmission lines and adjacent conductors, according to embodiments of the present disclosure.

Figure 1:
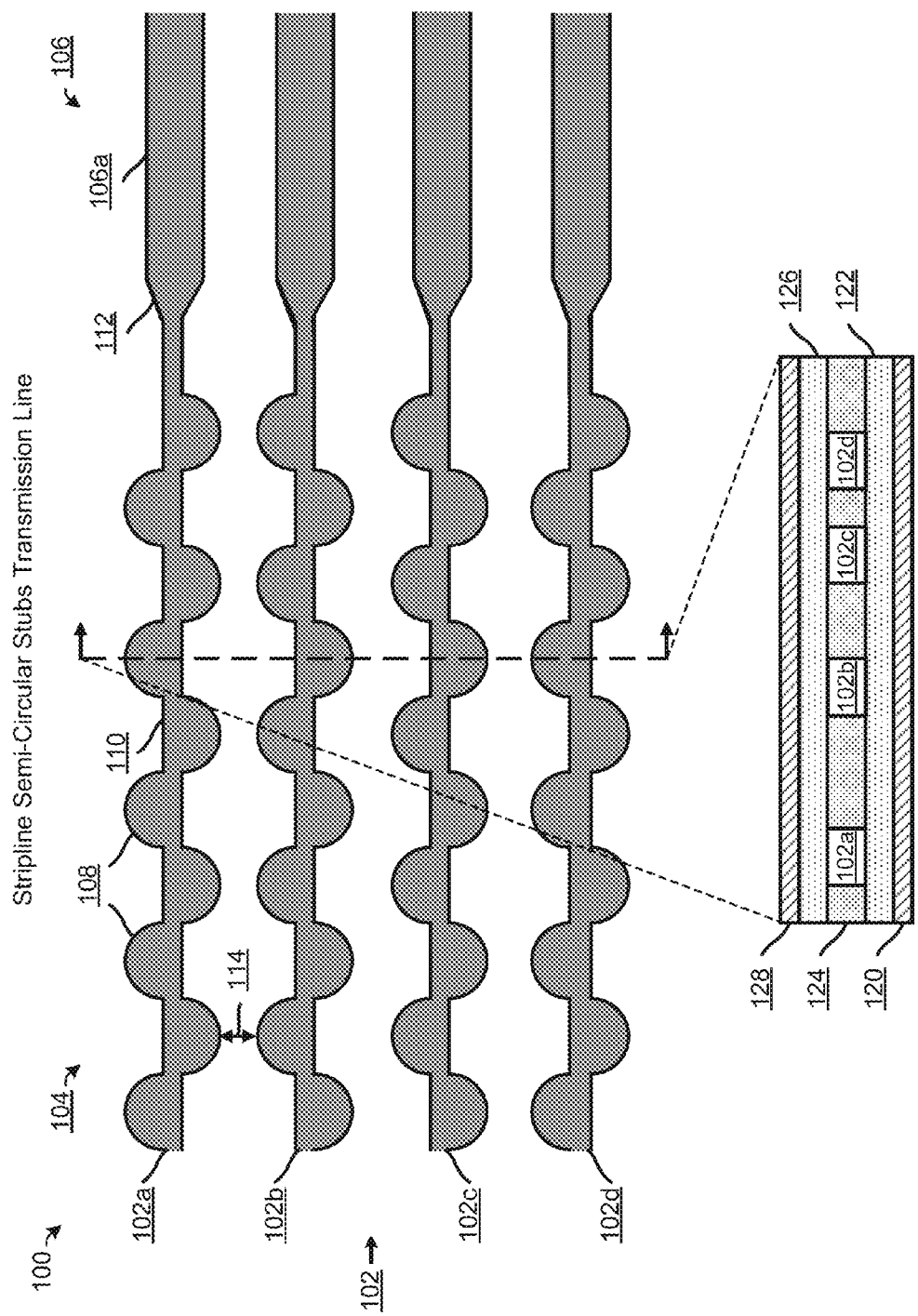
FIGS. 1 and 2 are block diagrams illustrating stripline semi-circular stubs transmission lines according to an embodiment of the present disclosure.

FIG. 1 shows stripline semi-circular stubs transmission line 100 that includes conductors 102 having mitigation conductor sections 104 and non-mitigation conductor sections 106, and including conductor 102a, conductor 102b, conductor 102c, and conductor 102d, where conductors 102 are illustrated in a plane view. Stripline semi-circular stubs transmission line 100 further includes ground plane 120, dielectric layer 122 coupled to ground plane 120 and conductors 102a-102d, and that separates ground plane 120 from conductors 102a-102d, dielectric layer 124 coupled to dielectric layer 122 and conductors 102a-102a, and that separates conductors 102a-102d from each other, dielectric layer 126 coupled to dielectric layer 124 and conductors 102a-102d, and ground plane 128 coupled to dielectric layer 126 and that is separated from conductors 102a-102d by dielectric layer 126, where ground planes 120 and 128, dielectric layers 122, 124, and 126, and conductors 102a-102d are depicted in a cross section view of stripline semi-circular stubs transmission line 100 as indicated by the dashed cross section line in the direction of the arrows.

Mitigation conductor section 104 of conductor 102a includes linear section 110 having a first side surface and a second side surface, and one or more alternating semi-circular stubs 108 extending from the first side surface and the second side surface of linear section 110. Non-mitigation conductor section 106 of conductor 102a includes linear section 106a. Mitigation section 104 of conductor 102a is connected to non-mitigation section 106 of conductor 102*a* via connector section 112 that transitions between the widths of linear section 110 and 106*a*, where the width of linear section 110 may be less than or equal to the width of linear section 106*a* and the length of connector section 112 may be greater than or equal to zero. Semi-circular stub 108 of conductor 102*a* facing semi-circular stub 108 of adjacent conductor 102*b* is separated by distance 114 from each other. Semi-circular stub 108 may have a semi-circular shape, as illustrated, or a substantially semi-circular shape, where the radius r of the substantially semi-circular shape may vary from the center of the substantially semi-circular shape to each point of the circumference of the substantially semi-circular shape between 0% and 10% due to manufacturing tolerances when forming semi-circular stub 108.

Connector section 112 of conductor 102*a* occurs at a neck-down region, where mitigation conductor section 104 of conductor 102*a* is routed between a ball grid array via grid for a device in the neck-down region. In order for mitigation conductor section 104 of conductor 102*a* to meet clearance requirements between the via grid, the width of linear section 110 is reduced such that it is less than the width of linear section 106*a* of non-mitigation conductor section 106. Similarly, connection section 112 may occur at a breakout region, a bump-out trace region, a congested trace region, and the like.

The impedance of mitigation conductor section 104 of conductor 102*a* may differ from the impedance of non-mitigation conductor section 106 of conductor 102*a* due to the difference in widths of linear section 110 and linear section 106*a*, where non-mitigation conductor section 106 of conductor 102*a* typically use wider trace widths to compensate for higher skin effect losses at higher frequencies. The narrower width of linear section 110 of mitigation conductor section 104 typically results in a higher impedance than the impedance of non-mitigation conductor section 106. Semi-circular stubs 108 of mitigation conductor section 104 are structured to reduce this impedance mismatch and/or match the impedance of mitigation conductor section 104 and the impedance of non-mitigation conductor section 106 of conductor 102*a*. As such, the resilience of impedance variation due to manufacturing tolerances in printed circuit board traces is improved.

Conductors 102*b*, 102*c*, and 102*d* are similar to conductor 102*a*. Conductor 102*b* may be a victim conductor and adjacent conductors 102*a* and 102*c* may be aggressor conductors such that a signal propagating in conductor 102*b* may be subject to cross talk from signals propagating in the adjacent conductors 102*a* and 102*c*. This cross talk may be near end cross talk (NEXT) experienced in mitigation conductor section 104 of conductor 102*b* and far end cross talk (FEXT) experienced in non-mitigation conductor section 106 of conductor 102*b*. Similarly, signals propagating in conductors 102*a*, 102*c* and 102 may be subject to both NEXT and FEXT from signals propagating in their adjacent conductors. Each mitigation conductor sections 104 of conductors 102*a*, 102*b*, 102*c*, and 102*d* is structured to mitigate and reduce NEXT experienced in each mitigation conductor section 104 due to their adjacent conductors, which includes the radius, number, and placement of each semi-circular stub 108 of each mitigation conductor section 104. The semi-circular shape of each semi-circular stub 108 allows the distance 114 that separates semi-circular stub 108 of a conductor facing semi-circular stub 108 of an adjacent conductor to be reduced while meeting clearance requirements. Stripline transmission lines exhibit minimal to no FEXT due to conductors 102 being sandwiched between ground planes 120 and 128 and surrounded by dielectric layers 122, 124, and 126. As such, FEXT is minimized and/or eliminated in stripline semi-circular stubs transmission line 100.

Stripline semi-circular stubs transmission line 100 may utilize single-ended signaling to transmit information using a single conductor, for example, conductor 102*a*, 102*b*, 102*c*, and 102*d*, to propagate a single signal. In another embodiment, stripline semi-circular stubs transmission line 100 may utilize differential signaling to transmit information using two complementary signals, where the same signal is propagated as a differential pair of signals, each in its own conductor. For example, conductors 102*a* and 102*b* may propagate one differential pair of signals and conductors 102*c* and 102*d* may propagate another differential pair of signals. The structure of mitigation conductor section 104 of conductors 102*a*, 102*b*, 102*c*, and 102*d* improve the impedance match between mitigation conductor section 104 and non-mitigation conductor section 106 and reduce NEXT experienced by each conductor 102*a*, 102*b*, 102*c*, and 102*d* due to their adjacent conductors for both single-ended and differential conductors.

Figure 2:
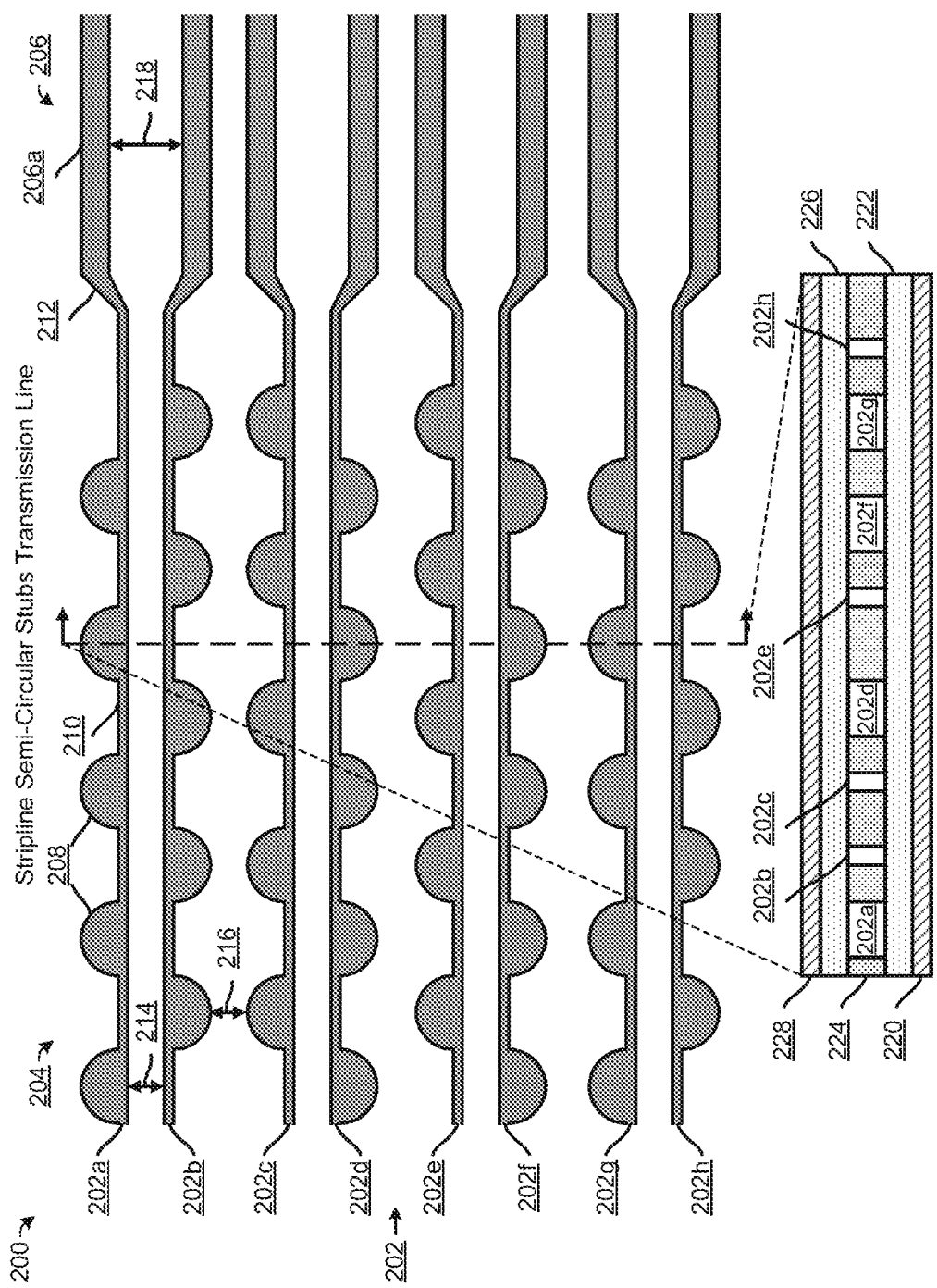

FIG. 2 shows stripline semi-circular stubs transmission line 200 that includes conductors 202 having mitigation conductor sections 204 and non-mitigation conductor sections 206, and including conductor 202*a*, conductor 202*b*, conductor 202*c*, conductor 202*d*, conductor 202*e*, conductor 202*f*, conductor 202*g*, and conductor 202*h*, where conductors 202 are illustrated in a plane view. Stripline semi-circular stubs transmission line 200 further includes ground plane 220, dielectric layer 222 coupled to ground plane 220 and conductors 202*a*-202*h*, and that separates ground plane 220 from conductors 202*a*-202*h*, dielectric layer 224 coupled to dielectric layer 222 and conductors 202*a*-202*h*, and that separates conductors 202*a*-202*h* from each other, dielectric layer 226 coupled to dielectric layer 224 and conductors 202*a*-202*h*, and ground plane 828 coupled to dielectric layer 226 and that is separated from conductors 202*a*-202*h* by dielectric layer 226, where ground planes 220 and 228, dielectric layers 222, 224, and 226, and conductors 202*a*-202*h* are depicted in a cross section view of stripline semi-circular stubs transmission line 200 as indicated by the dashed cross section line in the direction of the arrows.

Mitigation conductor section 204 of conductor 202*a* includes linear section 210 having a first side surface and a second side surface, and one or more semi-circular stubs 208 extending from the first side surface of linear section 210. Non-mitigation conductor section 206 of conductor 202*a* includes linear section 206*a*. Mitigation section 204 of conductor 202*a* is connected to non-mitigation section 206 of conductor 202*a* via connector section 212 that transitions between the widths of linear section 210 and 206*a*, where the width of linear section 210 may be less than or equal to the width of linear section 206*a* and the length of connector section 212 may be greater than or equal to zero. Mitigation conductor section 204 of conductor 202*a* facing mitigation conductor section 204 of conductor 202*b* is separated by distance 214 from each other. Semi-circular stub 208 of conductor 202*b* facing semi-circular stub 208 of conductor 202*c* is separated by distance 216 from each other. Non-mitigation conductor section 206*a* facing non-mitigation conductor section 206 of conductor 202*b* is separated by distance 218 from each other. Conductors 202*a*-202*h* are similar to conductors 102*a*-102*d* of stripline semi-circular stubs transmission line 100, where semi-circular stubs 208 of mitigation conductor section 204 are structured to reduce the impedance mismatch and/or match the impedance of mitigation conductor section 204 and the impedance of non-mitigation conductor section 206 of conductor 202a. Similarly, conductors 202b-202h are similar to conductor 202a, where each mitigation conductor sections 204 of conductors 202a-202h is structured to mitigate and reduce NEXT experienced in each mitigation conductor section 204 due to their adjacent conductors, which includes the radius, number, and placement of each semi-circular stub 208 of each mitigation conductor section 204. Distances 214, 216, and 218 that separate adjacent conductors may be reduced while meeting the clearance requirements.

Similar to stripline semi-circular stubs transmission line 100 described above, stripline semi-circular stubs transmission line 200 may utilize single-ended signaling to transmit information using a single conductor, for example, conductor 202a, 202b, 202c, 202d, 202e, 202f, 202g, and 202h, to propagate a single signal. In another embodiment, stripline semi-circular stubs transmission line 200 may utilize differential signaling to transmit information using two complementary signals, where the same signal is propagated as a differential pair of signals, each in its own conductor. For example, conductors 202a and 202b may propagate one differential pair of signals and conductors 202c and 202d may propagate another differential pair of signals. The structure of mitigation conductor section 204 of conductors 202a-202h improve the impedance match between mitigation conductor section 204 and non-mitigation conductor section 206 and reduce NEXT experienced by each conductor 202a-202h due to their adjacent conductors for both single-ended and differential conductors.

Figure 3:
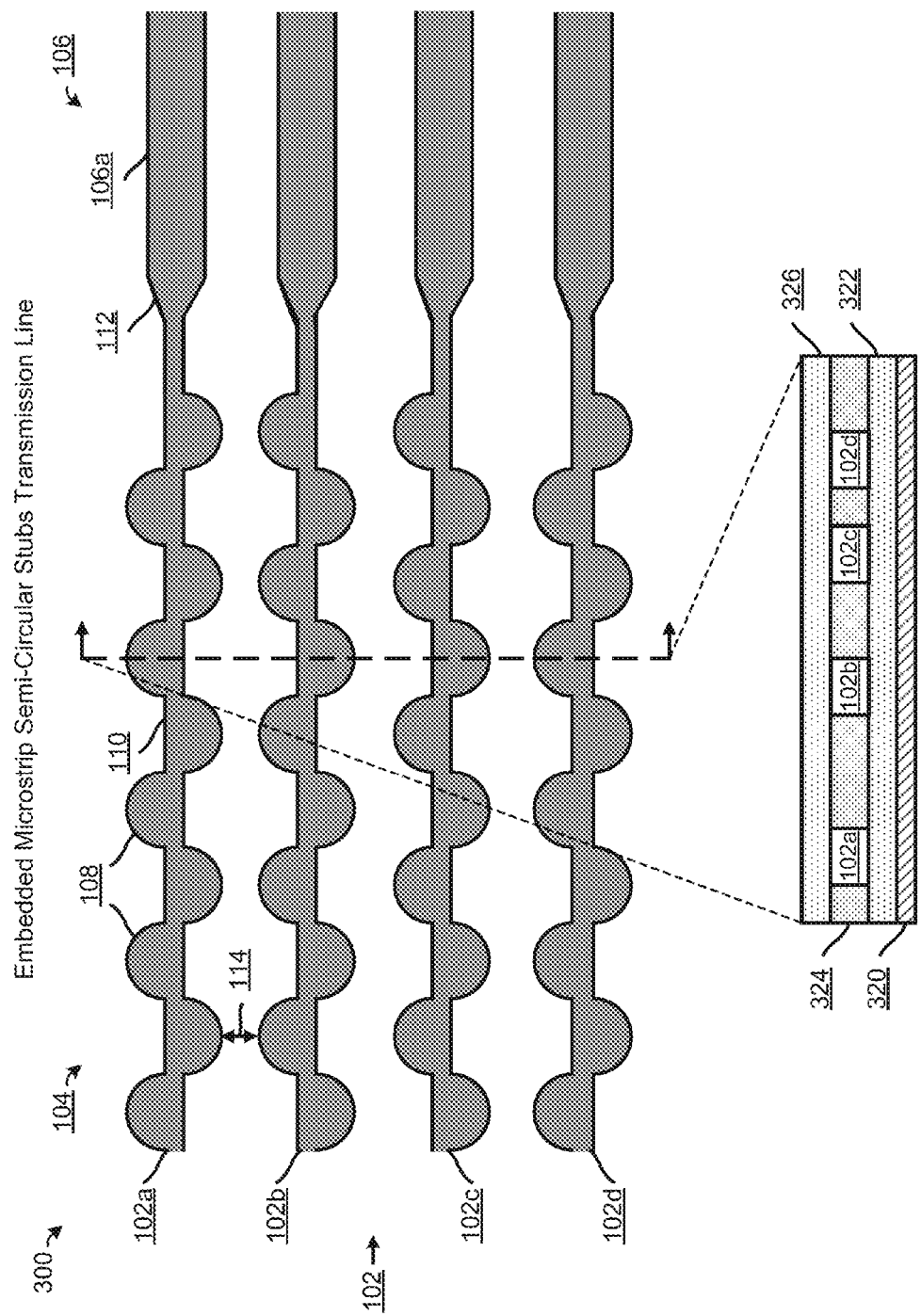
FIG. 3 is a block diagram illustrating an embedded microstrip semi-circular stubs transmission line according to an embodiment of the present disclosure.

FIG. 3 shows embedded microstrip semi-circular stubs transmission line 300 that includes conductors 102 previously described. Embedded microstrip semi-circular stubs transmission line 300 further includes ground plane 320, dielectric layer 322 coupled to ground plane 320 and conductors 102a-102d, and that separates ground plane 320 from conductors 102a-102d, dielectric layer 324 coupled to dielectric layer 322 and conductors 102a-102d, and that separates conductors 102a-102d from each other, and dielectric layer 326 coupled to dielectric layer 324 and conductors 102a-102d, where ground plane 320, dielectric layers 322, 324, and 326, and conductors 102a-102d are depicted in a cross section view of stripline semi-circular stubs transmission line 300 as indicated by the dashed cross section line in the direction of the arrows.

Embedded microstrip semi-circular stubs transmission line 300 is similar to stripline semi-circular stubs transmission line 100 described above, where the structure of Embedded microstrip semi-circular stubs transmission line 300 improve the impedance match between mitigation conductor section 104 and non-mitigation conductor section 106 and reduce NEXT experienced by each conductor 102a-102d due to their adjacent conductors for both single-ended and differential conductors.

Figure 4:
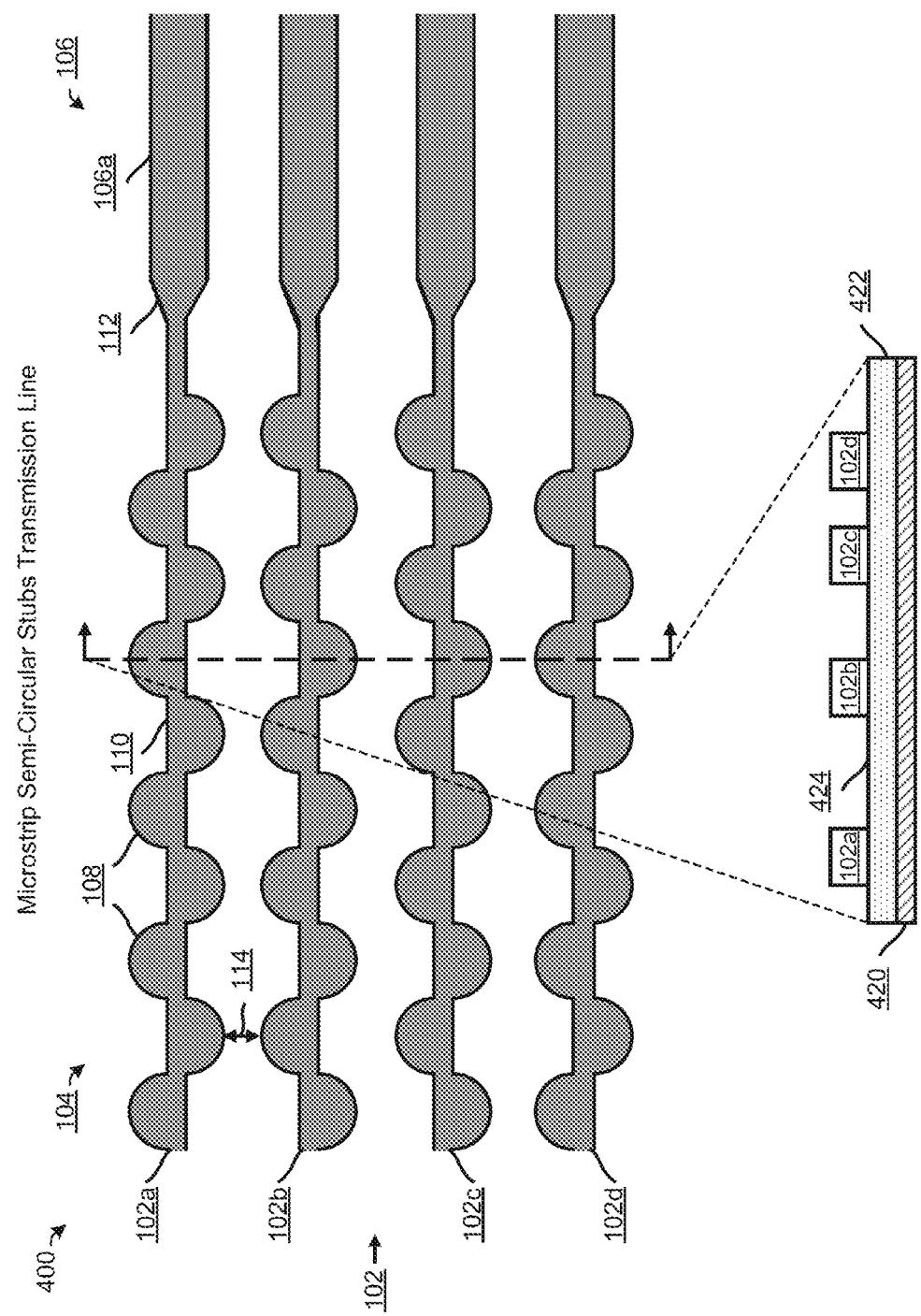
FIG. 4 is a block diagram illustrating a microstrip semi-circular stubs transmission line according to an embodiment of the present disclosure.

FIG. 4 shows microstrip semi-circular stubs transmission line 400 that includes conductors 102 previously described. Microstrip semi-circular stubs transmission line 400 further includes ground plane 420, dielectric layer 422 coupled to ground plane 420 and conductors 102a-102d, and conductors 102a-102d. Dielectric layer 422 and conductors 102a-102d are surrounded by air medium 424. Ground plane 420, dielectric layer 422, and conductors 102a-102d are depicted in a cross section view of stripline semi-circular stubs transmission line 400 as indicated by the dashed cross section line in the direction of the arrows.

Microstrip semi-circular stubs transmission line 400 is similar to stripline semi-circular stubs transmission line 100 described above, where the structure of microstrip semi-circular stubs transmission line 400 improve the impedance match between mitigation conductor section 104 and non-mitigation conductor section 106 and reduce NEXT experienced by each conductor 102a-102d due to their adjacent conductors for both single-ended and differential conductors.

Microstrip semi-circular stubs transmission line 400 may exhibit far end cross talk (FEXT) due to the inhomogeneous medium around it, in particular, the air medium 424 on one side of conductors 102a-102d and dielectric layer 422 on the other side. Semi-circular stubs 108 of conductors 102 help mitigate the inductive and capacitive coupling between conductors 102 of microstrip semi-circular stubs transmission line 400 and, as such, also reduce FEXT experienced by each conductor 102a-102d due to their adjacent conductors for both single-ended and differential conductors.

Figure 5:
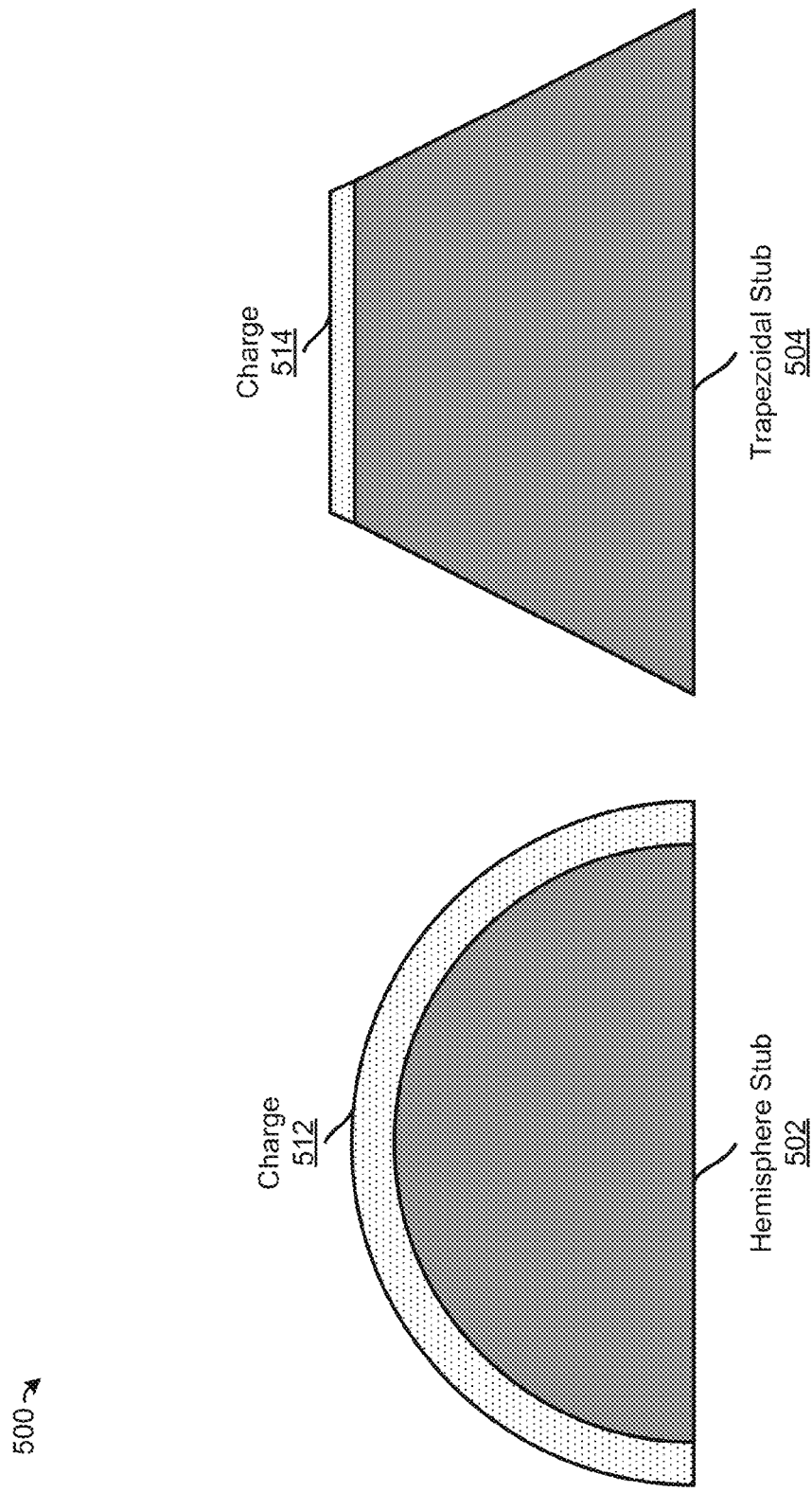
FIG. 5 is a block diagram illustrating a distribution of charge on a semi-circular stub of a transmission line of FIGS. 1-4 and the distribution of charge on a trapezoidal stub of a transmission line according to an embodiment of the present disclosure.

FIG. 5 shows a distribution of charge 512 on semi-circular stub 502 of a transmission line and the distribution of charge 514 on trapezoidal stub 504 of another transmission line. Semi-circular stub 502 may be semi-circular stubs 108 of stripline semi-circular stubs transmission line 100, embedded microstrip semi-circular stubs transmission line 300, and microstrip semi-circular stubs transmission line 400, and semi-circular stubs 208 of stripline semi-circular stubs transmission line 200, described above. The other transmission line having trapezoidal stubs 504 may be similar to the structure of stripline semi-circular stubs transmission lines 100 and 200, embedded microstrip semi-circular stubs transmission line 300, and microstrip semi-circular stubs transmission line 400, where trapezoidal stubs 504 are utilized instead of semi-circular stubs 108 and 208.

Semi-circular stub 502 has more area for the distribution of charge 512 at high frequencies than the area for the distribution of charge 514 of trapezoidal stub 504 at high frequencies due to skin effect, where the skin effect is the tendency of the distribution of charge 512, the current density, to be largest near the surface of semi-circular stub 502, the conductor. The larger distribution of charge 512 of semi-circular stub 502 results in better impedance matching at the breakout and neck down regions and mitigation of NEXT than trapezoidal stub 504. The larger area for the distribution of charge 512 also allows semi-circular stub 502 to have smaller dimensions and greater spacing between conductors 102 and 202 than can be achieved with trapezoidal stub 504, which also results in lower NEXT of semi-circular stubs 504 transmission lines than transmission lines having trapezoidal stubs 504.

Figure 6:
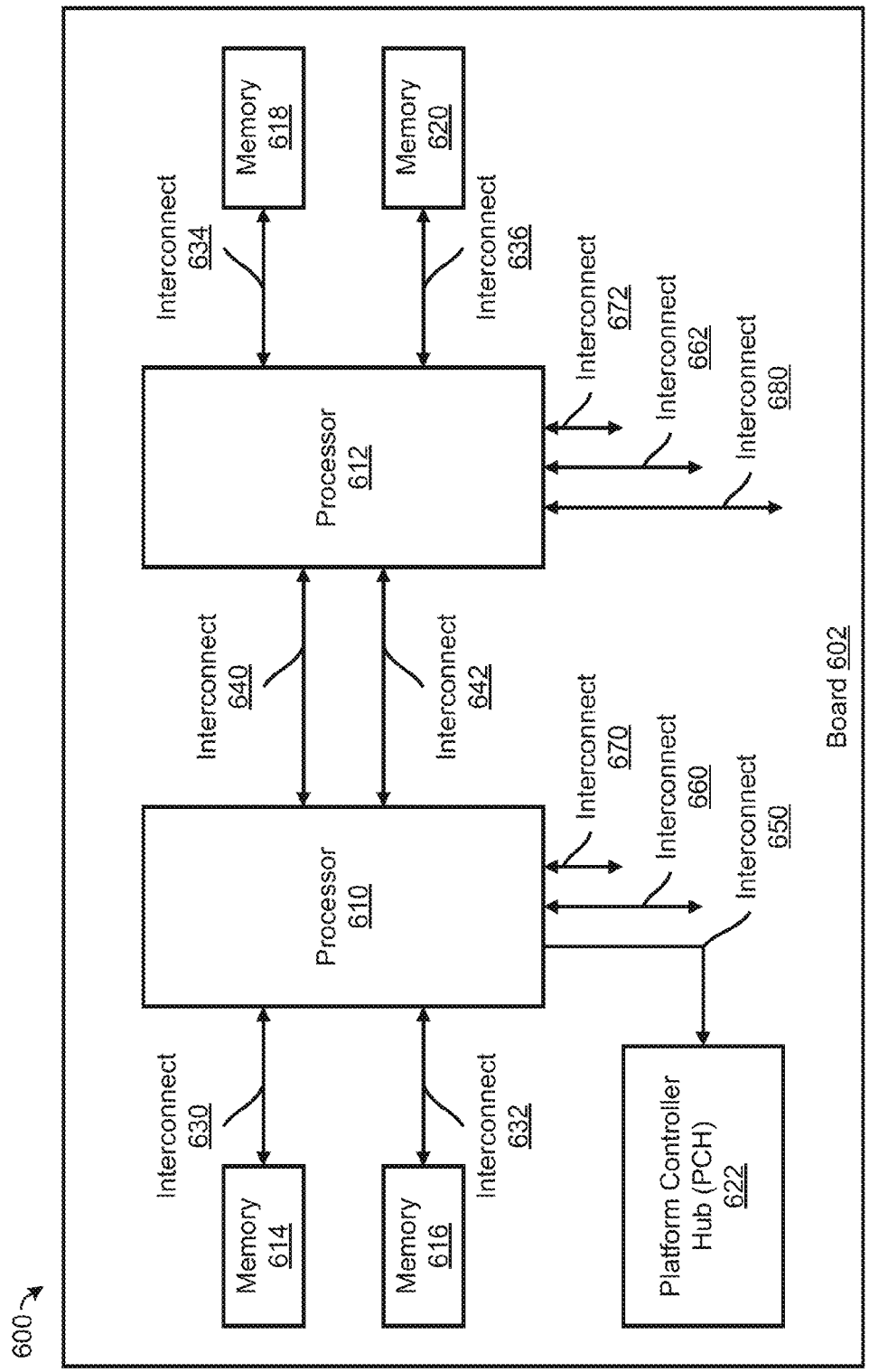
FIG. 6 is a block diagram of an information handling system having a printed circuit board according to an embodiment of the present disclosure.

FIG. 6 shows information handling system 600 that utilize semi-circular stubs transmission lines for the transmission and reception of a plurality of signals to mitigate NEXT between conductors of the semi-circular stubs transmission lines and adjacent conductors. For the purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a Central Processing Unit (CPU), a Programmable Logic Array (PLA), an embedded device such as a System-On-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various Input and Output (I/O) devices, such as a keyboard, a mouse, and a video display.

Information handling system 600 includes printed circuit board 602, processors 610 and 612, memories 614, 616, 618, and 620, and platform controller hub 622. Processors 610 and 612 communicate with each other via interconnects 640 and 642. Processor 610 communicates with memories 614 and 616 via interconnects 630 and 632, respectively. Processor 612 communicates with memories 618 and 620 via interconnects 634 and 636, respectively. Processor 610 communicates with platform controller hub 622 via interconnect 650 and may communicate with external devices (not illustrated) via interconnects 660 and 670. Processor 612 may communicate with external devices (not shown) via interconnects 680, 662, and 672. Interconnects 630, 632, 634, 636, 640, 642, 650, 660, 662, 670, 672, and 680 may be stripline semi-circular stubs transmission lines 100 and 200, embedded microstrip semi-circular stubs transmission line 300, and microstrip semi-circular stubs transmission line 400 implemented in or on printed circuit board 602.

Printed circuit board 602 may be a single, double, or multi-layer printed circuit board that allows the semi-circular stubs transmission lines to be on different layers and connected with the devices of information handling system 600 with plated through holes, vias.

Memories 614, 616, 618, and 620 may be a double data rate synchronous dynamic random access memory (DDR SDRAM), for example, a DDR2 SDRAM, a DDR3 SDRAM and a DDR4 SDRAM, a DDR dual inline memory module (DDR NVM DIMM), a DDR single inline memory module (DDR NVM SIMM), a synchronous dynamic random access memory (SDRAM), a non-volatile memory module (NVM), and the like. Interconnects 630, 632, 634, and 636 may be single ended semi-circular stubs transmission lines for communication between processors 610 and 612 and memories 614, 616, 618, and 620.

Interconnects 640 and 642 for communication between processors 610 and 612 may be a Universal Path Interconnect (UPI) Intel®, a QuickPath Interconnect (QPI) Intel®, a coherent accelerator processor interface (CAPI) IBM®, and the like, which may be differential semi-circular stubs transmission lines.

Interconnect 650 for communication between processor 610 and platform controller hub 622 may be a direct media interface (DMI) Intel®, a hub interface, an enterprise Southbridge interface, and the like, which may be a differential semi-circular stubs transmission line.

Interconnects 660, 662, 670, 672, and 680 for communication between processors 610 and 612 and the devices connected via interconnects 660, 662, 670, 672, and 680 may be a Peripheral Component Interconnect Express (PCIe), an Omni-Path Interconnect, an InfiniBand Interconnect, a Fibre Channel Interconnect, an Ethernet interconnect (e.g. GBit Ethernet, 10 GBit Ethernet) and the like, which may be single ended semi-circular stubs transmission lines and differential semi-circular stubs transmission lines, as appropriate to the type of interconnect.

The design and layout of the printed circuit board 602 including the placement of processors 610 and 612, memories 614, 616, 618, and 620, and platform controller hub 622 and the design and routing of the semi-circular stubs transmission lines, interconnects 630, 632, 634, 636, 640, 642, 650, 660, 662, 670, 672, and 680, may be performed by a printed circuit board design and layout software program.

By utilizing single ended and differential semi-circular stubs transmission lines, interconnects 630, 632, 634, 636, 640, 642, 650, 660, 662, 670, 672, and 680, to connect the devices of information handling system 600, the number of layers required to route printed circuit board 602 may be minimized while the number of interconnects and routing congestion is increased. Further, the single ended and differential semi-circular stubs transmission lines result in improved impedance matching between mitigation conductor sections and non-mitigation conductor sections and reduction in NEXT between the conductors of the semi-circular stubs transmission lines and adjacent conductors.

Figure 7:
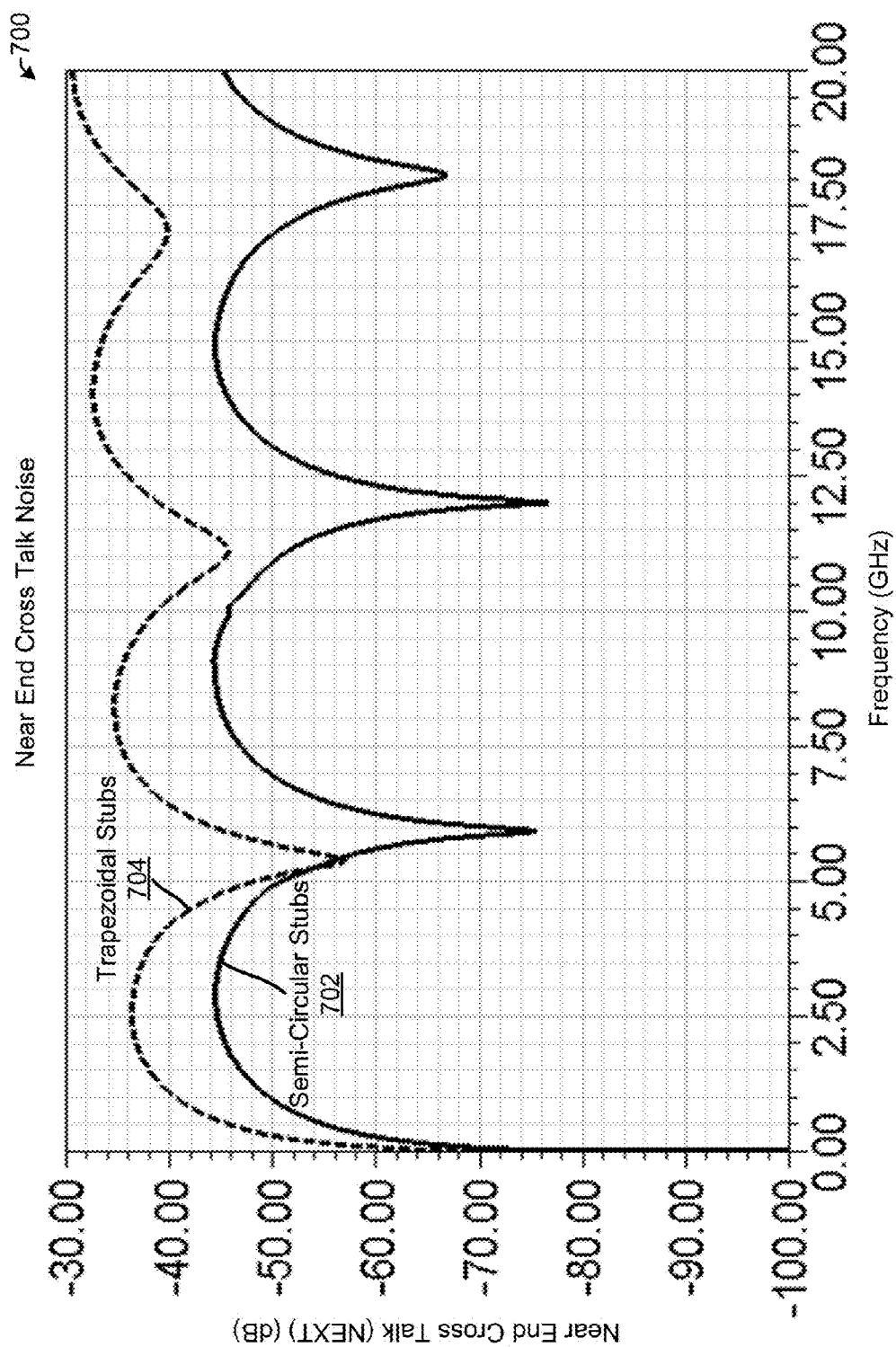
FIG. 7 is a plot of near end cross talk mitigation curves of a stripline semi-circular stubs transmission line and a stripline trapezoidal stubs transmission line according to an embodiment of the present disclosure.

FIG. 7 shows a plot 700 of near end cross talk mitigation curves of stripline semi-circular stubs transmission line 200 and a stripline trapezoidal stubs transmission line similar to stripline semi-circular stubs transmission line 200 but having trapezoidal stubs 504 instead of semi-circular stubs 208. The near end cross talk mitigation curve 702 of stripline semi-circular stubs transmission line 200 shows almost a 10-15 dB improvement in NEXT as compared to the near end cross talk mitigation curve 704 of the stripline trapezoidal stubs transmission line. It may also be noted that the stripline trapezoidal stubs transmission line may result in increased NEXT due to the proximity of the trapezoidal stubs to each other, even as the trapezoidal stubs may improve the impedance mismatch and FEXT. As such, the signal integrity of the stripline trapezoidal stubs transmission line is impacted.

FIGS. 8-13 show comparison plots of eye diagrams of stripline semi-circular stubs transmission line 200 and the stripline trapezoidal stubs transmission line similar to stripline semi-circular stubs transmission line 200 but having trapezoidal stubs 504 instead of semi-circular stubs 208. Time domain simulations are performed at various data rates and conditions to derive the eye diagram comparison plots.

Figure 8:
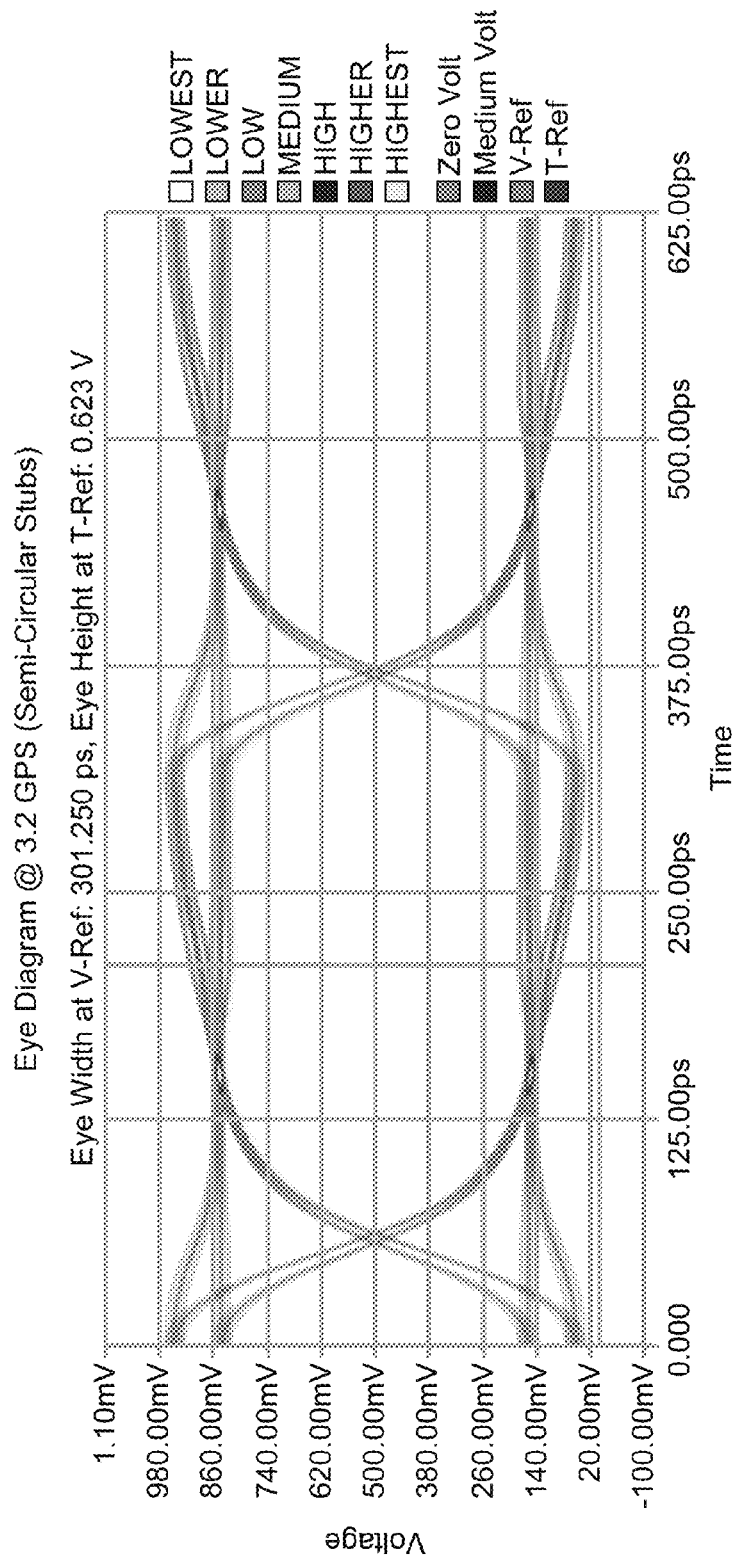
FIGS. 8-13 are comparison plots of eye diagrams of a stripline semi-circular stubs transmission line and a stripline trapezoidal stubs transmission line according to an embodiment of the present disclosure.
Figure 9:
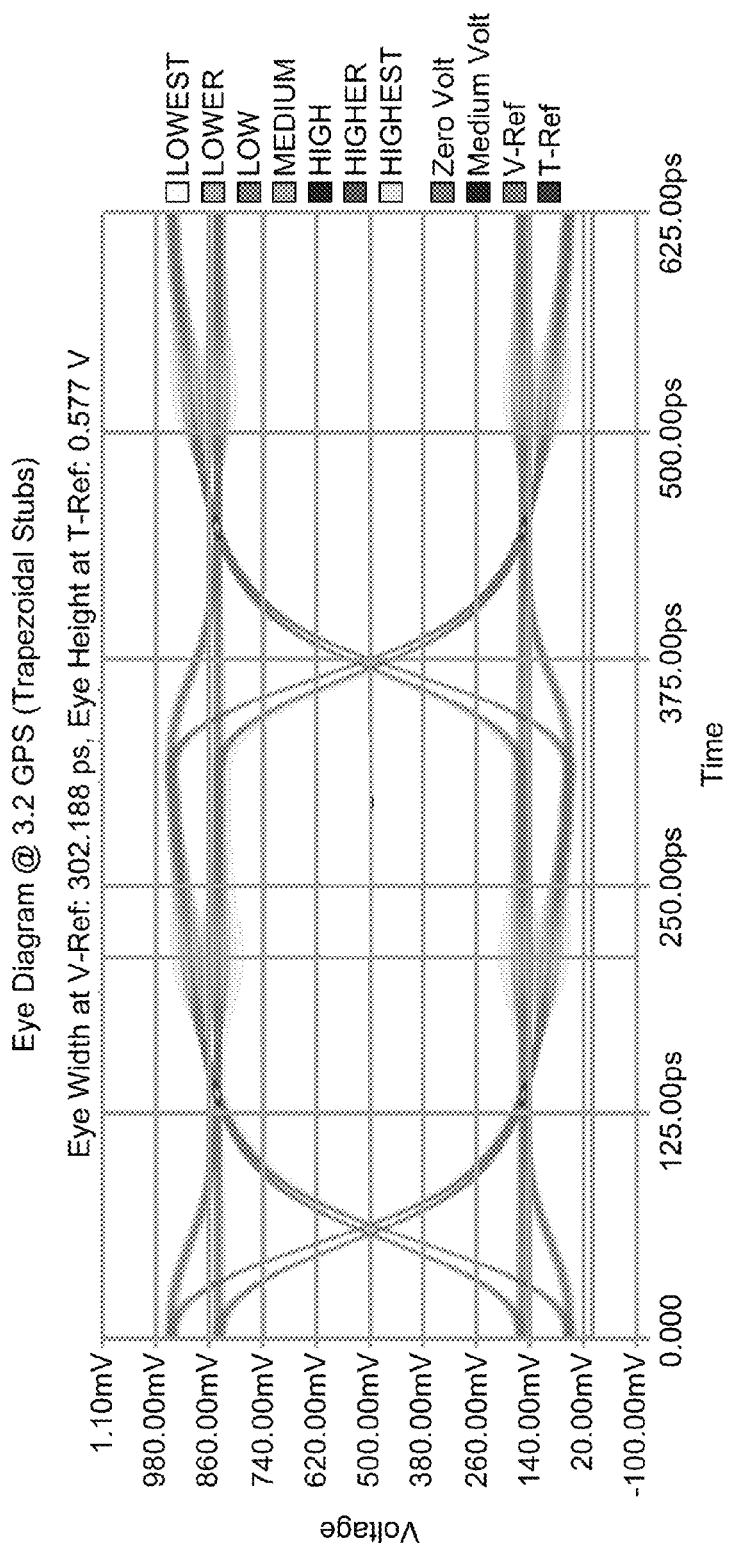
Figure 10:
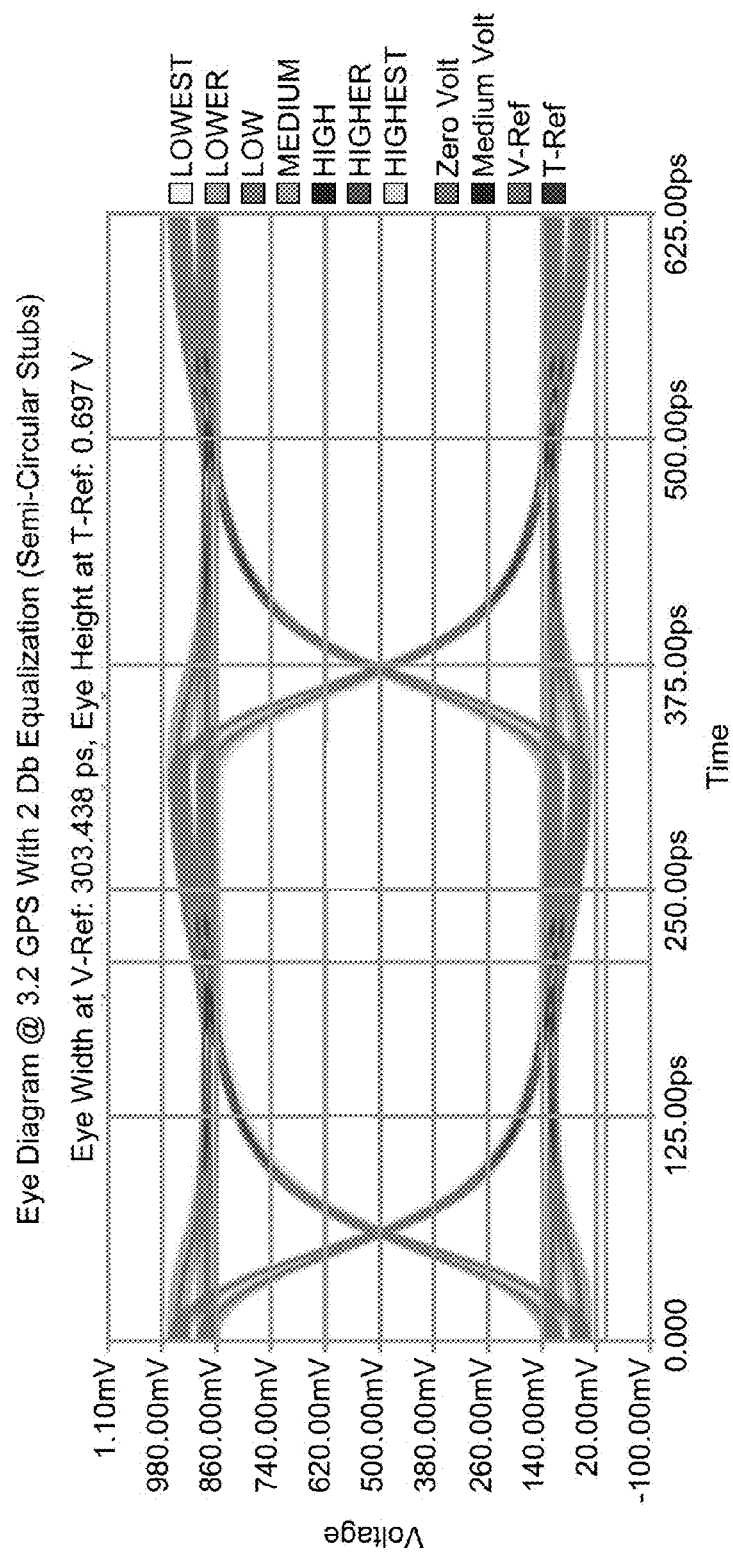
Figure 11:
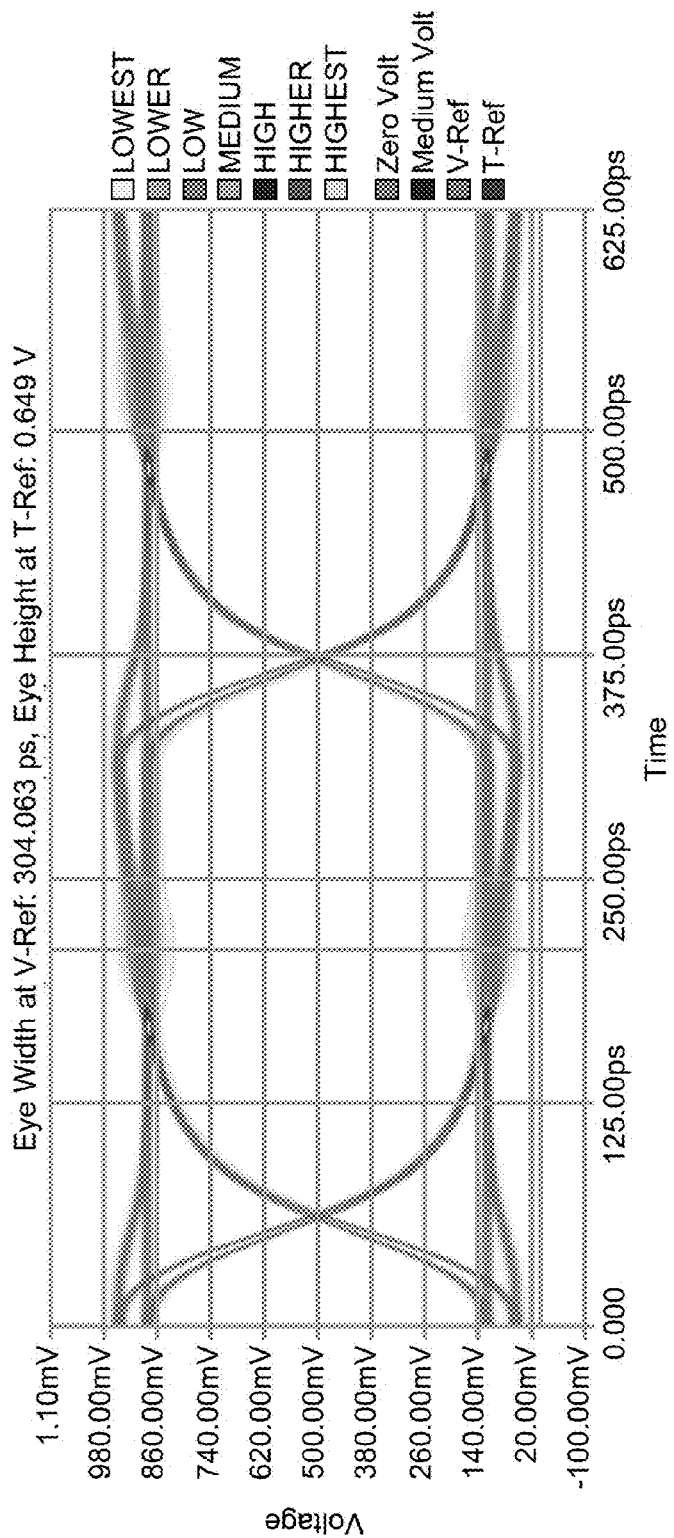
Figure 12:
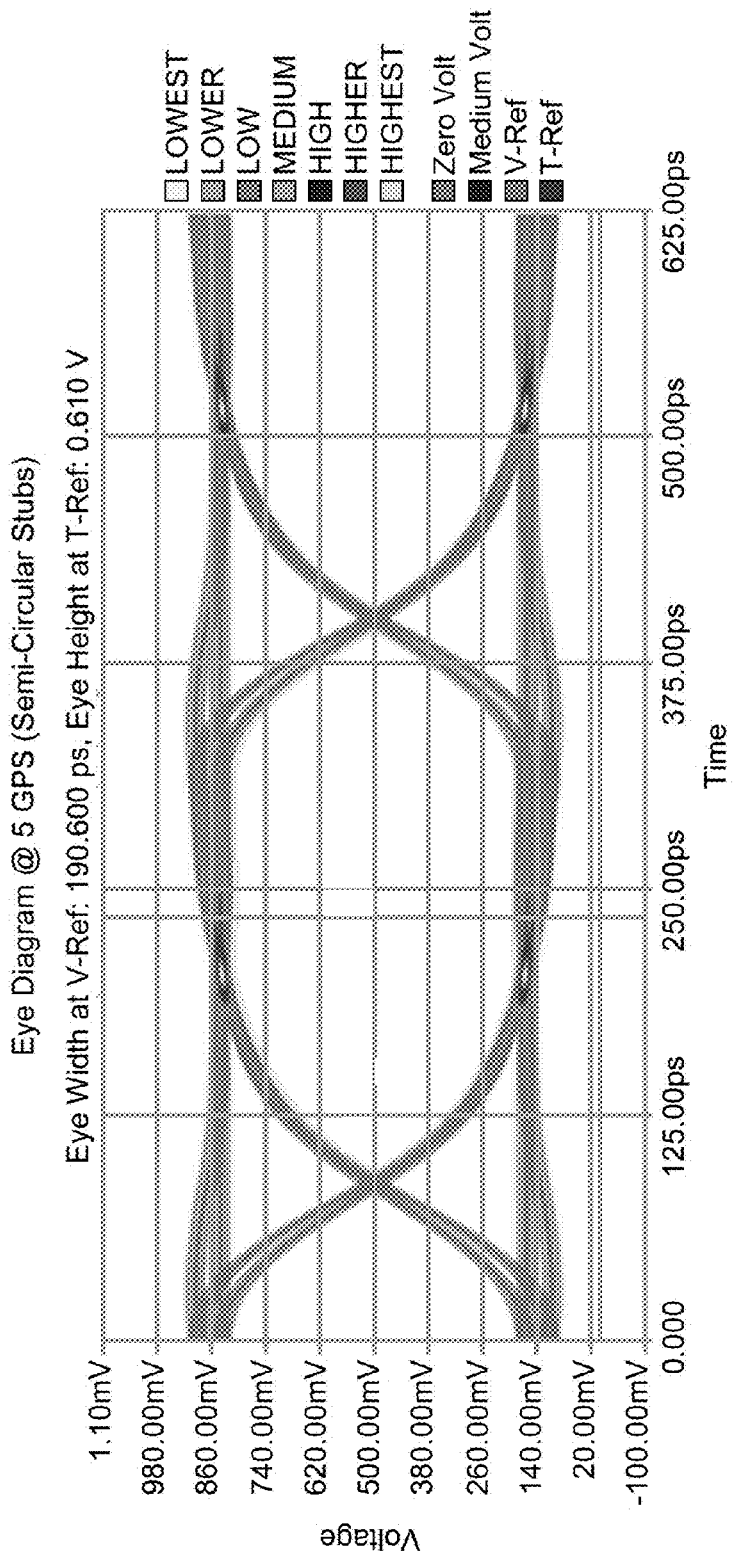
Figure 13:
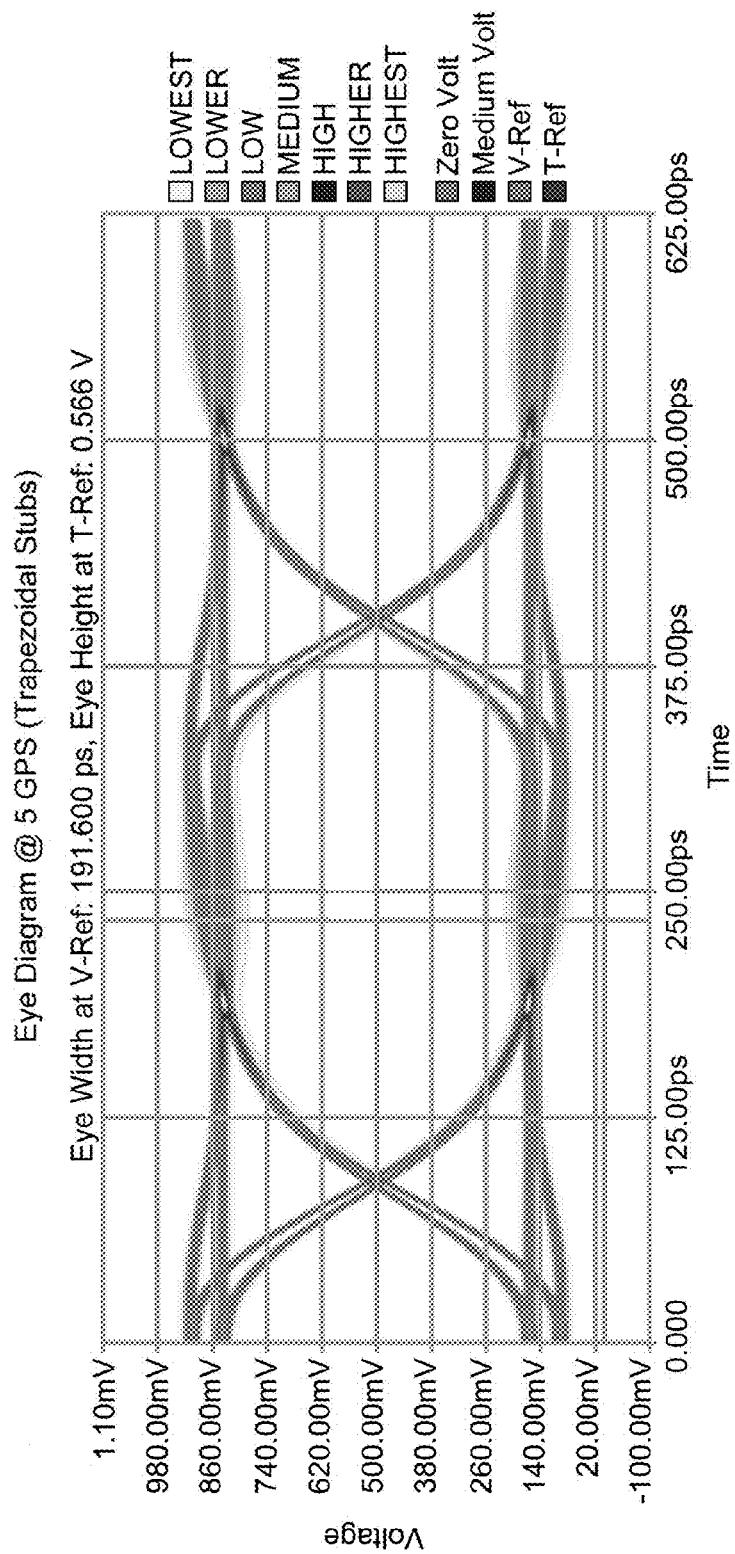

As shown in FIGS. 8 and 9, eye diagram 800 of stripline semi-circular stubs transmission line 200 shows a 10% improvement in margin over eye diagram 900 of the stripline trapezoidal stubs transmission line at a 3.2 Giga-bit per second (Gbps) data rate. Eye diagram 1000 of stripline semi-circular stubs transmission line 200 of FIG. 10 shows a 10% improvement in margin over eye diagram 1100 of the stripline trapezoidal stubs transmission line of FIG. 11 at a 3.2 Giga-bit per second (Gbps) data rate with 2 Db equalization. Finally, as shown in FIGS. 12 and 13, eye diagram 1200 of stripline semi-circular stubs transmission line 200 also shows a 10% improvement in margin over eye diagram 1300 of the stripline trapezoidal stubs transmission line at a 5 Giga-bit per second (Gbps) data rate.

Figure 14:
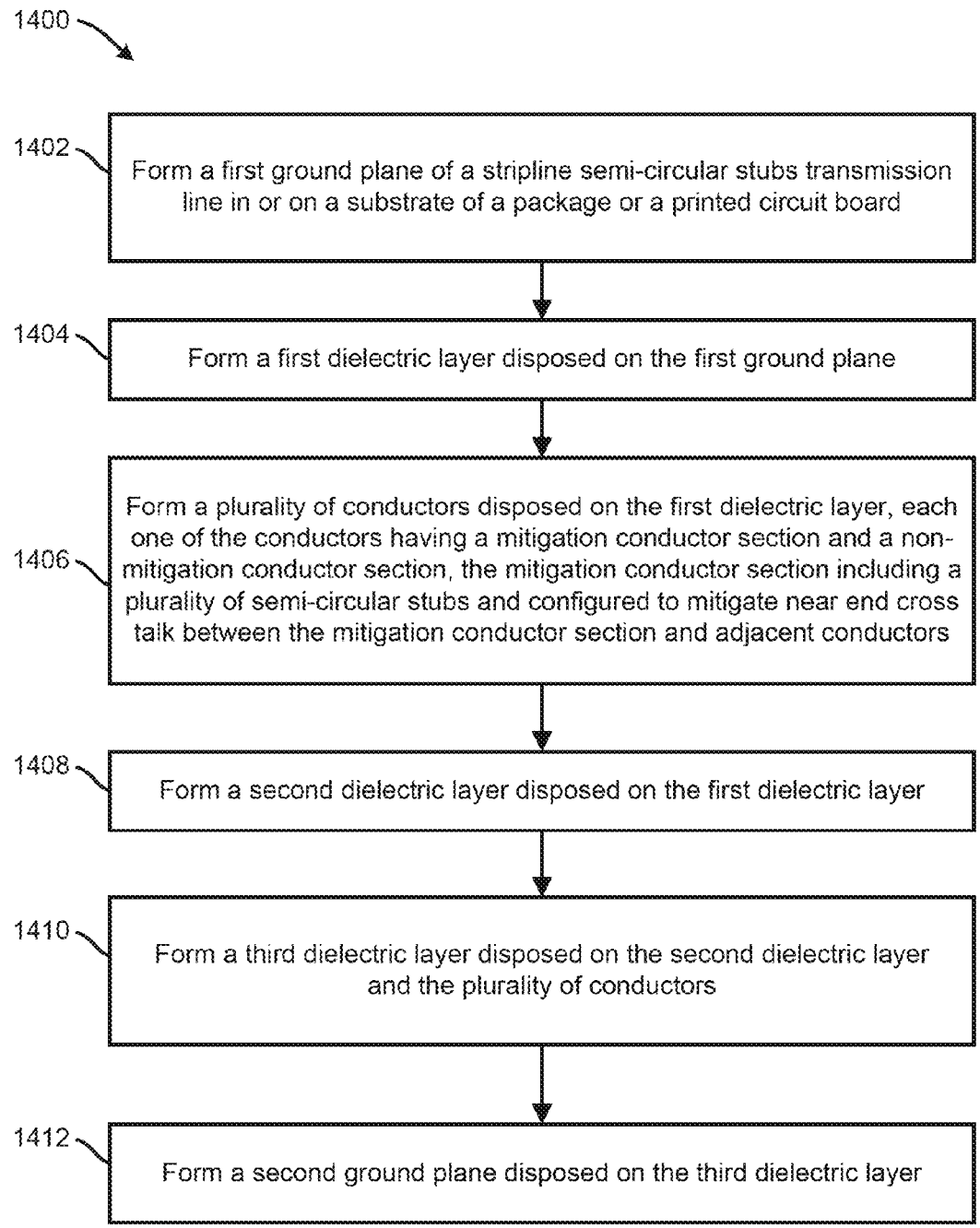
FIG. 14 is a flowchart of a method of forming a stripline semi-circular stubs transmission line according to an embodiment of the present disclosure.

FIG. 14 illustrates a method 1400 of forming a stripline semi-circular stubs transmission line, such as stripline semi-circular stubs transmission line 100, by an information handling system using printed circuit board technology, where the information handling system may be information handling system 1700 of FIG. 17, described in detail below. Method 1400 begins at block 1402, where information handling system 1700 forms a first ground plan 120 of stripline semi-circular stubs transmission line 100 in or on a substrate of a package or a printed circuit board, for example, printed circuit board 602. At block 1404, information handling system 1700 forms a first dielectric layer 122 disposed on the first ground plan 120.

At block 1406, information handling system 1700 forms a plurality of conductors 102a-102d disposed on the first dielectric layer 122, each one of the plurality of conductors 102a-102d, having a mitigation conductor section 104 and a non-mitigation conductor section 106, the mitigation conductor section 104 including a plurality of semi-circular stubs 108 and configured to mitigate near end cross talk between the mitigation conductor section 104 and adjacent conductors 102a-102d.

At block 1408, information handling system 1700 forms a second dielectric layer 124 disposed on the first dielectric layer 122. At block 1410, information handling system 1700 forms a third dielectric layer 126 disposed on the second dielectric layer 124 and the plurality of conductors 102a-102d. At block 1412, information handling system 1700 forms a second ground plan 128 disposed on the third dielectric layer 126.

Figure 15:
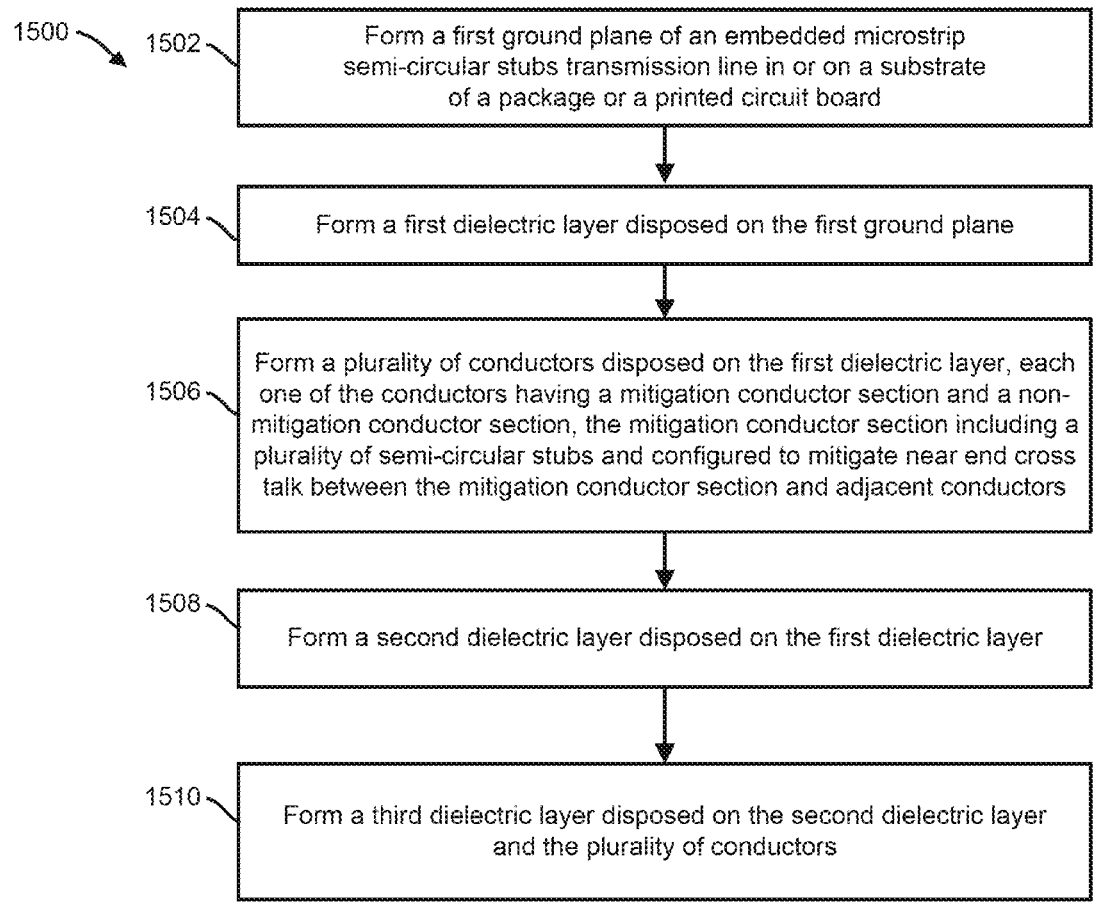
FIG. 15 is a flowchart of a method of forming an embedded microstrip semi-circular stubs transmission line according to an embodiment of the present disclosure.
Figure 17:
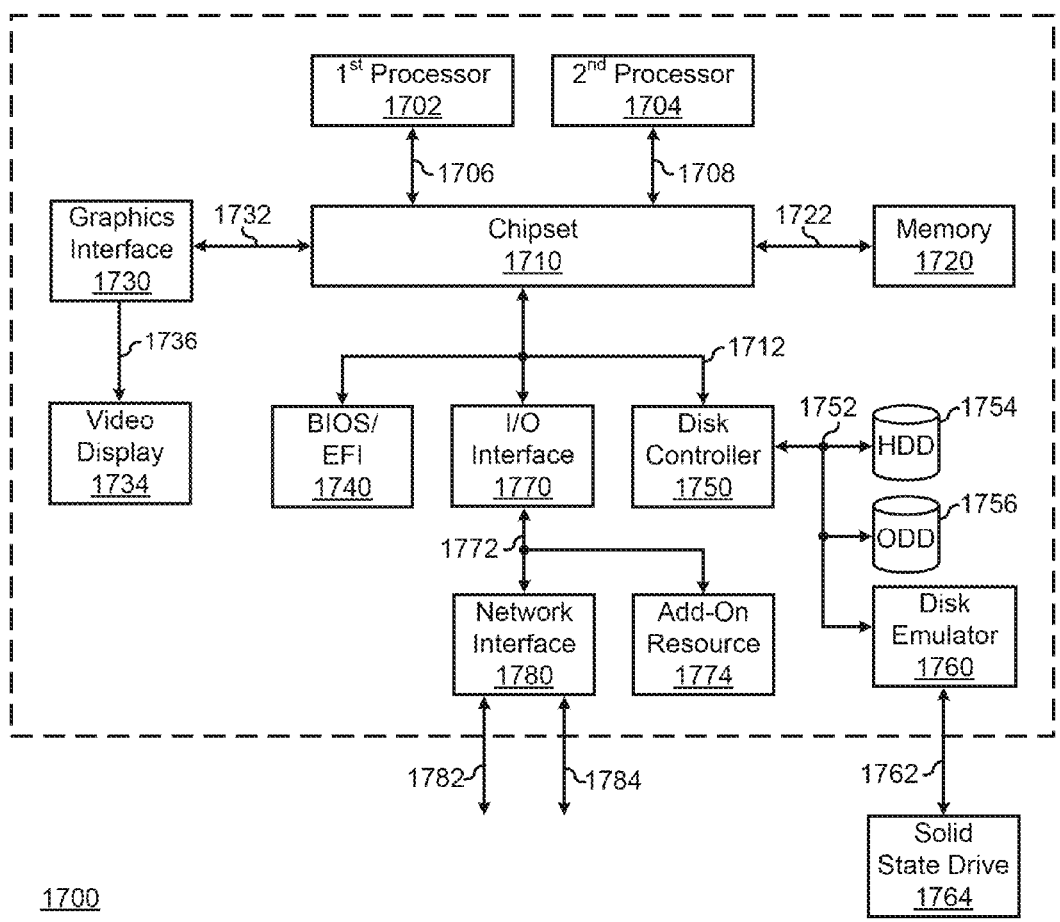
FIG. 17 is a block diagram illustrating a generalized information handling system according to an embodiment of the present disclosure.

FIG. 15 is a flowchart of a method of forming an embedded microstrip semi-circular stubs transmission line according to an embodiment of the present disclosure;

FIG. 15 illustrates a method 1500 of forming an embedded microstrip semi-circular stubs transmission line, such as embedded microstrip semi-circular stubs transmission line 300, by an information handling system, where the information handling system may be information handling system 1700 of FIG. 17. Method 1500 is similar to method 1400 and begins at block 1502, where information handling system 1700 forms a first ground plan 320 of embedded microstrip semi-circular stubs transmission line 300 in or on a substrate of a package or a printed circuit board, for example, printed circuit board 602. At block 1504, information handling system 1700 forms a first dielectric layer 322 disposed on the first ground plan 320.

At block 1506, information handling system 1700 forms a plurality of conductors 102a-102d disposed on the first dielectric layer 322, each one of the plurality of conductors 102a-102d having a mitigation conductor section 104 and a non-mitigation conductor section 106, the mitigation conductor section 104 including a plurality of semi-circular stubs 108 and configured to mitigate near end cross talk between the mitigation conductor section 104 and adjacent conductors 102a-102d.

At block 1508, information handling system 1700 forms a second dielectric layer 324 disposed on the first dielectric layer 322. At block 1510, information handling system 1700 forms a third dielectric layer 326 disposed on the second dielectric layer 324 and the plurality of conductors 102a-102d.

Figure 16:
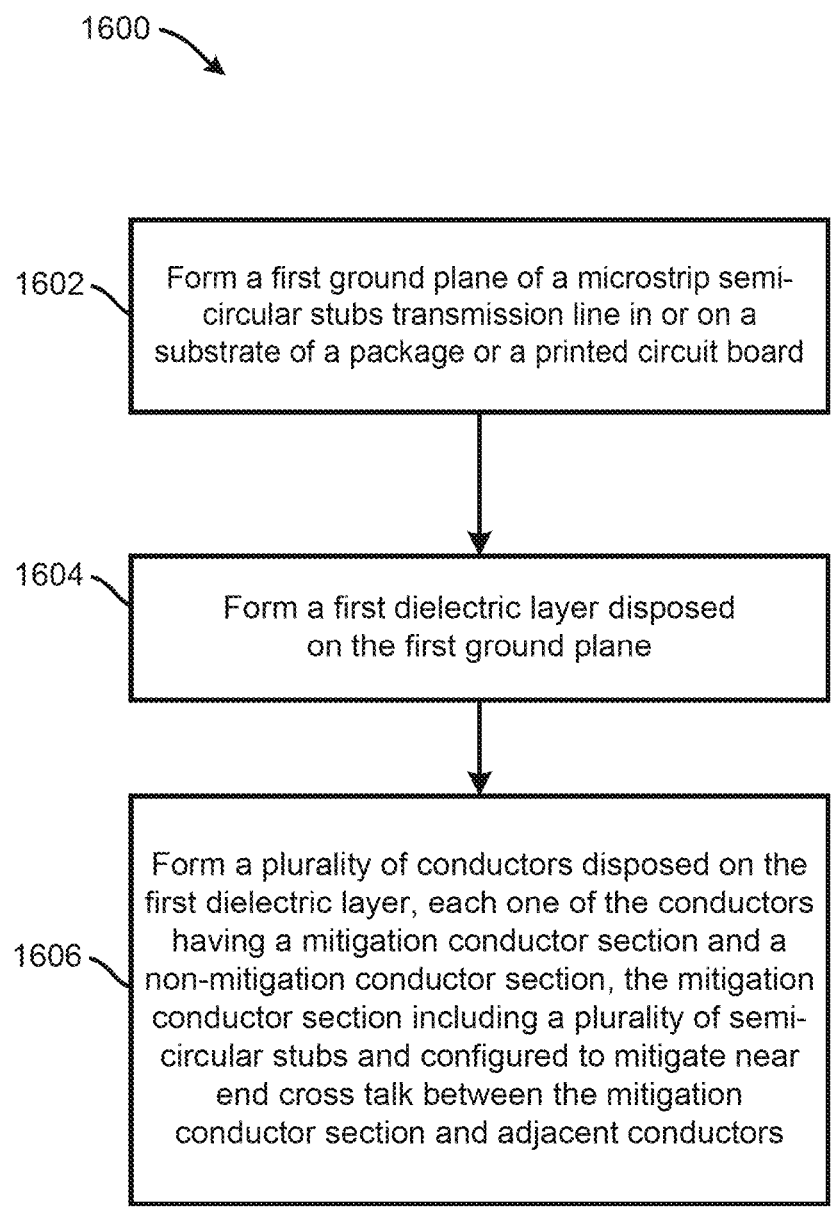
FIG. 16 is a flowchart of a method of forming a microstrip semi-circular stubs transmission line according to an embodiment of the present disclosure.

FIG. 16 illustrates a method 1600 of forming a microstrip semi-circular stubs transmission line, such as microstrip semi-circular stubs transmission line 400, by an information handling system, where the information handling system may be information handling system 1700 of FIG. 17. Method 1600 is similar to method 1400 and begins at block 1602, where information handling system 1700 forms a first ground plan 420 of microstrip semi-circular stubs transmission line 400 in or on a substrate of a package or a printed circuit board, for example, printed circuit board 602. At block 1604, information handling system 1700 forms a first dielectric layer 422 disposed on the first ground plan 420.

At block 1606, information handling system 1700 forms a plurality of conductors 102a-102d disposed on the first dielectric layer 422, each one of the plurality of conductors 102a-102d having a mitigation conductor section 104 and a non-mitigation conductor section 106, the mitigation conductor section 104 including a plurality of semi-circular stubs 108 and configured to mitigate near end cross talk between the mitigation conductor section 104 and adjacent conductors 102a-102d.

FIG. 17 illustrates a generalized embodiment of information handling system 1700. For purpose of this disclosure information handling system 1700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1700 can include processing resources for executing machine-executable code, such as a Central Processing Unit (CPU), a Programmable Logic Array (PLA), an embedded device such as a System-On-a-Chip (SoC), or other control logic hardware. Information handling system 1700 can also include one or more computer-readable medium for storing machine-executable code, such as software or data. Additional components of information handling system 1700 can include one or more storage devices that can store machine-executable code, one or more communications ports for communicating with external devices, and various Input and Output (I/O) devices, such as a keyboard, a mouse, and a video display. Information handling system 1700 can also include one or more buses operable to transmit information between the various hardware components.

Information handling system 1700 can include devices or modules that embody one or more of the devices or modules described above, and operates to perform one or more of the methods described above. Information handling system 1700 includes processors 1702 and 1704, a chipset 1710, a memory 1720, a graphics interface 1730, include a Basic Input Output System/Extensible Firmware Interface (BIOS/EFI) module 1740, a disk controller 1750, a disk emulator 1760, an Input/Output (I/O) interface 1770, and a network interface 1780. Processor 1702 is connected to chipset 1710 via processor interface 1706, and processor 1704 is connected to the chipset via processor interface 1708. Memory 1720 is connected to chipset 1710 via a memory bus 1722. Graphics interface 1730 is connected to chipset 1710 via a graphics interface 1732, and provides a video display output 1736 to a video display 1734. In a particular embodiment, information handling system 1700 includes separate memories that are dedicated to each of processors 1702 and 1704 via separate memory interfaces. An example of memory 1720 includes Random Access Memory (RAM) such as Static RAM (SRAM), Dynamic RAM (DRAM), Non-Volatile RAM (NV-RAM), or the like, Read Only Memory (ROM), another type of memory, or a combination thereof.

BIOS/EFI module 1740, disk controller 1750, and I/O interface 1770 are connected to chipset 1710 via an I/O channel 1712. An example of I/O channel 1712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 1710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 1740 includes BIOS/EFI code operable to detect resources within information handling system 1700, to provide drivers for the resources, initialize the resources, and access the resources. BIOS/EFI module 1740 includes code that operates to detect resources within information handling system 1700, to provide drivers for the resources, to initialize the resources, and to access the resources.

Disk controller 1750 includes a disk interface 1752 that connects the disc controller to a Hard Disk Drive (HDD) 1754, to an Optical Disk Drive (ODD) 1756, and to disk emulator 1760. An example of disk interface 1752 includes an Integrated Drive Electronics (IDE) interface, an Advanced Technology Attachment (ATA) such as a Parallel ATA (PATA) interface or a Serial ATA (SATA) interface, a SCSI interface, a USB interface, a proprietary interface, or a combination thereof. Disk emulator 1760 permits a solid-state drive 1764 to be connected to information handling system 1700 via an external interface 1762. An example of external interface 1762 includes a USB interface, an IEEE 1394 (Firewire) interface, a proprietary interface, or a combination thereof. Alternatively, solid-state drive 1764 can be disposed within information handling system 1700.

I/O interface 1770 includes a peripheral interface 1772 that connects the I/O interface to an add-on resource 1774 and to network interface 1780. Peripheral interface 1772 can be the same type of interface as I/O channel 1712, or can be a different type of interface. As such, I/O interface 1770 extends the capacity of I/O channel 1712 when peripheral interface 1772 and the I/O channel are of the same type, and the I/O interface translates information from a format suitable to the I/O channel to a format suitable to the peripheral channel 1772 when they are of a different type. Add-on resource 1774 can include a data storage system, an additional graphics interface, a Network Interface Card (NIC), a sound/video processing card, another add-on resource, or a combination thereof. Add-on resource 1774 can be on a main circuit board, on separate circuit board or add-in card disposed within information handling system 1700, a device that is external to the information handling system, or a combination thereof.

Network interface 1780 represents a NIC disposed within information handling system 1700, on a main circuit board of the information handling system, integrated onto another component such as chipset 1710, in another suitable location, or a combination thereof. Network interface device 1780 includes network channels 1782 and 1784 that provide interfaces to devices that are external to information handling system 1700. In a particular embodiment, network channels 1782 and 1784 are of a different type than peripheral channel 1772 and network interface 1780 translates information from a format suitable to the peripheral channel to a format suitable to external devices. An example of network channels 1782 and 1784 includes InfiniBand channels, Fibre Channel channels, Gigabit Ethernet channels, proprietary channel architectures, or a combination thereof. Network channels 1782 and 1784 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first device;
   a second device; and
   a stripline transmission line coupled to the first device and to the second device, the stripline transmission line comprising:
   a plurality of conductors, each one of the conductors having a mitigation conductor section and a non-mitigation conductor section, the mitigation conductor section including:
   a first linear section having a first side surface and a second side surface; and
   a first plurality of semi-circular stubs extending from the first side surface of the first liner section,
   wherein the conductors are single ended conductors for single ended signaling;
   wherein the mitigation conductor section is configured to mitigate near end cross talk between the mitigation conductor section and adjacent conductors.

2. The information handling system of claim 1, wherein the mitigation conductor section is further configured to match the impendance of the mitigation conductor section and the non-mitigation conductor section.

3. The information handling system of claim 1, wherein the first device is a double data rate memory device and the second device is a memory controller.

4. The information handling system of claim 3, further including a processor coupled to the memory controller.

5. The information handling system of claim 1, the stripline transmission line further comprising:
   a second plurality of conductors, each one of the second conductors having a second mitigation conductor section and a second non-mitigation conductor section, the second mitigation conductor section including:
   a second linear section having a third side surface and a fourth side surface; and
   a second plurality of semi-circular stubs extending from the third side surface of the second liner section,
   wherein the second conductors are differential conductors for differential signaling.

6. The information handling system of claim 1, further comprising a printed circuit board coupled to the first device and to the second device, wherein the mitigation conductor section is within a trace region of the printed circuit board that requires mitigation.

7. The information handling system of claim 1, further comprising a printed circuit board coupled to the first device and to the second device, the printed circuit board comprising the stripline transmission line.

8. The information handling system of claim 1, wherein the mitigation conductor section further comprises a second plurality of semi-circular stubs extending from the second side surface of the first liner section, wherein the second plurality of semi-circular stubs is configured to further mitigate near end cross talk between the mitigation conductor section and the adjacent conductors.

9. A transmission line comprising:
 a plurality of conductors, each one of the conductors having a mitigation conductor section and a non-mitigation conductor section, the mitigation conductor section including:
  a first linear section having a first side surface and a second side surface; and
  a first plurality of semi-circular stubs extending from the first side surface of the first liner section,
  wherein the conductors are single ended conductors for single ended signaling;
  wherein the mitigation conductor section is configured to mitigate near end cross talk between the mitigation conductor section and adjacent conductors.

10. The transmission line of claim 9, wherein the transmission line is a stripline transmission line.

11. The transmission line of claim 9, wherein the transmission line is an embedded microstrip transmission line.

12. The transmission line of claim 9, wherein the transmission line is a microstrip transmission line.

13. The transmission line of claim 9, wherein the mitigation conductor section is further configured to match impedance of the mitigation conductor section and the non-mitigation conductor section.

14. The transmission line of claim 9, wherein the mitigation conductor section further comprises a second plurality of semi-circular stubs extending from the second side surface of the first liner section, wherein the second plurality of semi-circular stubs is configured to further mitigate near end cross talk between the mitigation conductor section and the adjacent conductors.

15. The transmission line of claim 9, further comprising:
 a second plurality of conductors, each one of the second conductors having a second mitigation conductor section and a second non-mitigation conductor section, the second mitigation conductor section including:
  a second linear section having a third side surface and a fourth side surface; and
  a second plurality of semi-circular stubs extending from the third side surface of the second liner section, wherein the second conductors are differential conductors for differential signaling.

16. A stripline transmission line comprising:
 a plurality of conductors, each one of the conductors having a mitigation conductor section and a non-mitigation conductor section, the mitigation conductor section including:
  a first linear section having a first side surface and a second side surface; and
  a first plurality of semi-circular stubs extending from the first side surface of the first liner section,
  wherein conductors are single ended conductors for single ended signaling;
  wherein the mitigation conductor section is configured to mitigate near end cross talk between the mitigation conductor section and adjacent conductors.

17. The stripline transmission line of claim 16, wherein the mitigation conductor section is further configured to match the impedance of the mitigation conductor section and the non-mitigation conductor section.

18. The stripline transmission line of claim 15, further comprising:
 a second plurality of conductors, each one of the second conductors having a second mitigation conductor section and a second non-mitigation conductor section, the second mitigation conductor section including:
  a second linear section having a third side surface and a fourth side surface; and
  a second plurality of semi-circular stubs extending from the third side surface of the second liner section, wherein the second conductors are differential conductors for differential signaling.

19. The stripline transmission line of claim 16, wherein the mitigation conductor section is within a trace region of a printed circuit board that requires mitigation.

20. The stripline transmission line of claim 16, wherein the mitigation conductor section further comprises a second plurality of semi-circular stubs extending from the second side surface of the first liner section, wherein the second plurality of semi-circular stubs is configured to further mitigate near end cross talk between the mitigation conductor section and the adjacent conductors.

* * * * *